(12) United States Patent
Ghosh et al.

(10) Patent No.: US 9,998,195 B2
(45) Date of Patent: Jun. 12, 2018

(54) STATION (STA), ACCESS POINT (AP) AND METHOD FOR UPLINK SOUNDING

(71) Applicant: Intel Corporation, Santa Clara, CA (US)

(72) Inventors: Chittabrata Ghosh, Fremont, CA (US); Yaron Alpert, Hod Hasharoni (IL); Ziv Avital, Haifa (IL); Avi Mansour, Haifa (IL)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 15/086,596

(22) Filed: Mar. 31, 2016

(65) Prior Publication Data
US 2017/0264354 A1  Sep. 14, 2017

Related U.S. Application Data

(60) Provisional application No. 62/305,868, filed on Mar. 9, 2016.

(51) Int. Cl.
| | |
|---|---|
| *H04B 7/06* | (2006.01) |
| *H04B 7/0452* | (2017.01) |
| *H04B 7/0456* | (2017.01) |
| *H04W 84/12* | (2009.01) |

(52) U.S. Cl.
CPC ......... *H04B 7/0626* (2013.01); *H04B 7/0452* (2013.01); *H04B 7/0456* (2013.01); *H04B 7/0617* (2013.01); *H04W 84/12* (2013.01)

(58) Field of Classification Search
CPC .. H04B 7/0626; H04B 7/0452; H04B 7/0456; H04B 7/0617; H04W 72/0413

USPC .......................................................... 370/329
See application file for complete search history.

(56) References Cited

U.S. PATENT DOCUMENTS

| | | | | |
|---|---|---|---|---|
| 2015/0139089 A1* | 5/2015 | Azizi | ................... | H04W 4/008 370/329 |
| 2016/0143026 A1* | 5/2016 | Seok | ................. | H04W 72/0413 370/329 |
| 2016/0233932 A1* | 8/2016 | Hedayat | ............... | H04B 7/0421 |
| 2016/0255656 A1* | 9/2016 | Lou | ........................ | H04L 1/0026 |
| 2016/0295581 A1* | 10/2016 | Ghosh | ............... | H04W 72/0446 |
| 2016/0330732 A1* | 11/2016 | Moon | .................. | H04B 7/0617 |
| 2017/0111091 A1* | 4/2017 | Cao | ........................ | H04B 7/0452 |
| 2017/0150493 A1* | 5/2017 | Seok | .................... | H04B 7/0452 |

* cited by examiner

*Primary Examiner* — Stephen J Clawson
(74) *Attorney, Agent, or Firm* — Schwegman Lundberg & Woessner, P.A.

(57) ABSTRACT

Embodiments of an access point (AP), station (STA) and method for uplink sounding are generally described herein. The AP may transmit an uplink (UL) sounding trigger frame (TF) that indicates a request to receive UL sounding elements from a group of one or more stations (STAs). The AP may receive UL sounding elements from the STAs in accordance with UL multi-user multiple-input multiple-output (MU-MIMO) reception. The AP may also receive, from at least a portion of the STAs, UL sounding feedback that includes one or more UL sounding transmission parameters used by the portion of the STAs for UL sounding element transmissions. The UL sounding TF may further indicate the portion of the STAs that are to transmit the UL sounding feedback.

31 Claims, 11 Drawing Sheets

STATION (STA), ACCESS POINT (AP) AND METHOD FOR UPLINK SOUNDING

PRIORITY CLAIM

This application claims priority under 35 USC 119(e) to U.S. Provisional Patent Application Ser. No. 62/305,868, filed Mar. 9, 2016, reference number P95510Z (884.V26PRV), which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11 ax study group (SG) (named DensiFi). Some embodiments relate to high-efficiency (HE) wireless or high-efficiency WLAN or Wi-Fi (HEW) communications. Some embodiments relate to sounding, including uplink sounding.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
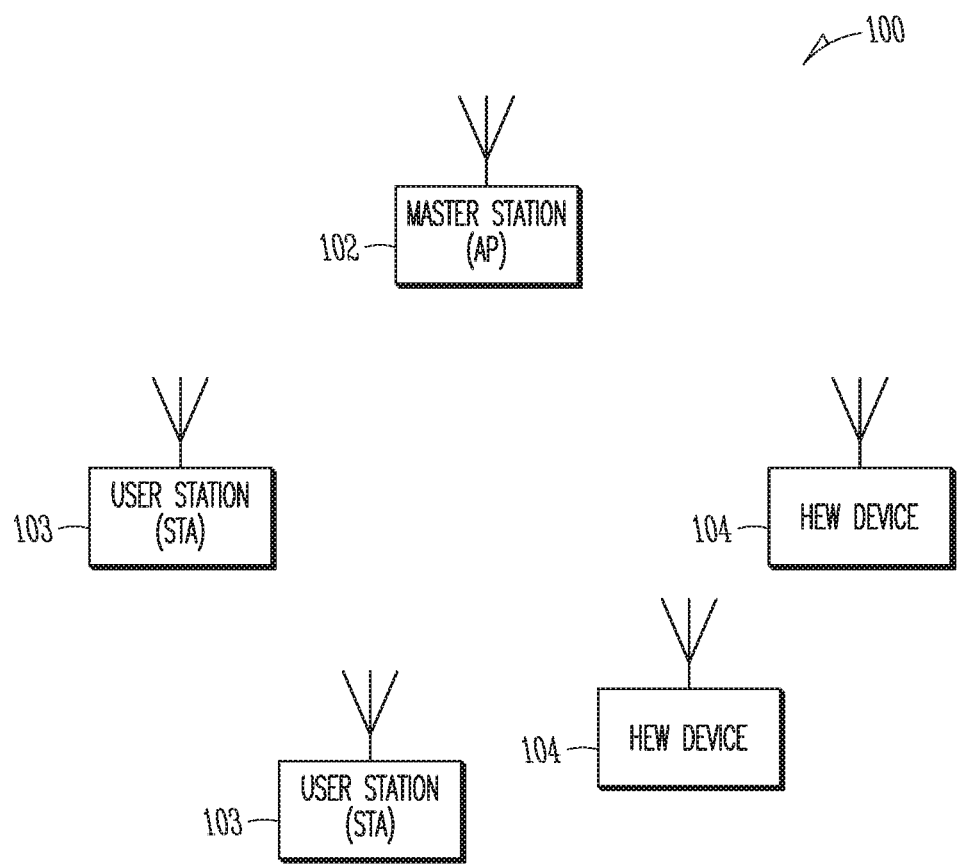
FIG. 1 illustrates a wireless network in accordance with some embodiments.

FIG. 1 illustrates a wireless network in accordance with some embodiments. In some embodiments, the network 100 may be a High Efficiency Wireless (HEW) Local Area Network (LAN) network. In some embodiments, the network 100 may be a Wireless Local Area Network (WLAN) or a Wi-Fi network. These embodiments are not limiting, however, as some embodiments of the network 100 may include a combination of such networks. That is, the network 100 may support HEW devices in some cases, non HEW devices in some cases, and a combination of HEW devices and non HEW devices in some cases. Accordingly, it is understood that although techniques described herein may refer to either a non HEW device or to an HEW device, such techniques may be applicable to both non HEW devices and HEW devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HEW devices 104. In some embodiments, the AP 102 may receive uplink (UL) data frames from one or more of the STAs 103 and may transmit one or more downlink data frames to the STAs 103.

The AP 102 may be arranged to communicate with one or more of the components shown in FIG. 1 in accordance with one or more IEEE 802.11 standards, other standards and/or other communication protocols. It should be noted that embodiments are not limited to usage of an AP 102. References herein to the AP 102 are not limiting and references herein to the master station 102 are also not limiting. In some embodiments, a STA 103, HEW device 104 and/or other device may be configurable to operate as a master station. Accordingly, in such embodiments, operations that may be performed by the AP 102 as described herein may be performed by the STA 103, HEW device 104 and/or other device that is configurable to operate as the master station.

In some embodiments, one or more of the STAs 103 may be legacy stations. These embodiments are not limiting, however, as the STAs 103 may be configured to operate as HEW devices 104 or may support HEW operation in some embodiments. The master station 102 may be arranged to communicate with the STAs 103 and/or the HEW stations 104 in accordance with one or more of the IEEE 802.11 standards. In accordance with some HEW embodiments, an access point (AP) may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, STAs 103 not operating as HEW devices may refrain from communicating in some cases. In some embodiments, the master-sync transmission may be referred to as a control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

In some embodiments, the HEW communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of an HEW communication may be configured for transmitting a number of spatial streams.

In some embodiments, high-efficiency wireless (HEW) techniques may be used, although the scope of embodiments is not limited in this respect. As an example, techniques included in 802.11ax standards and/or other standards may be used. In accordance with some embodiments, a master station 102 and/or HEW stations 104 may generate an HEW packet in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
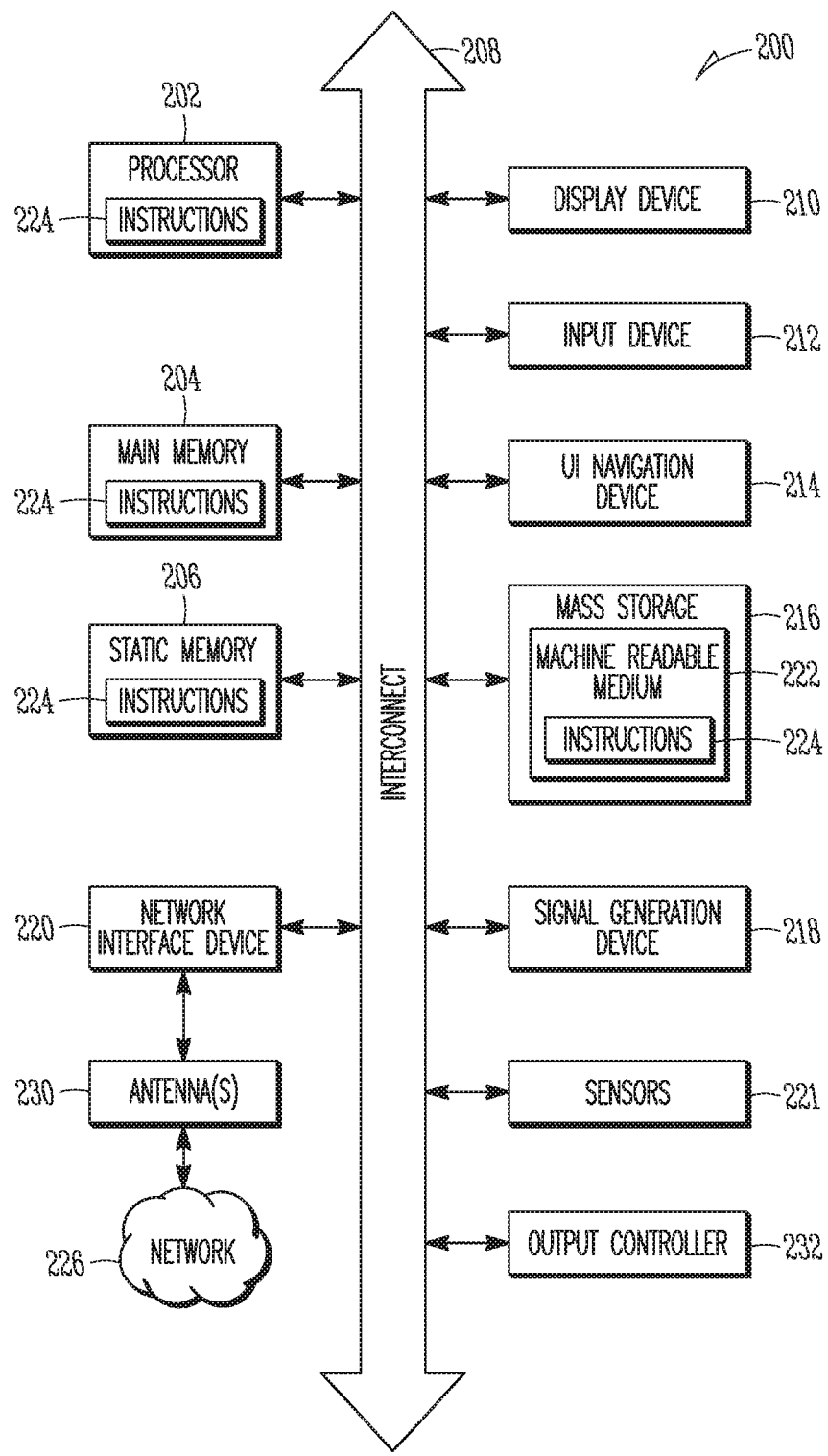
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
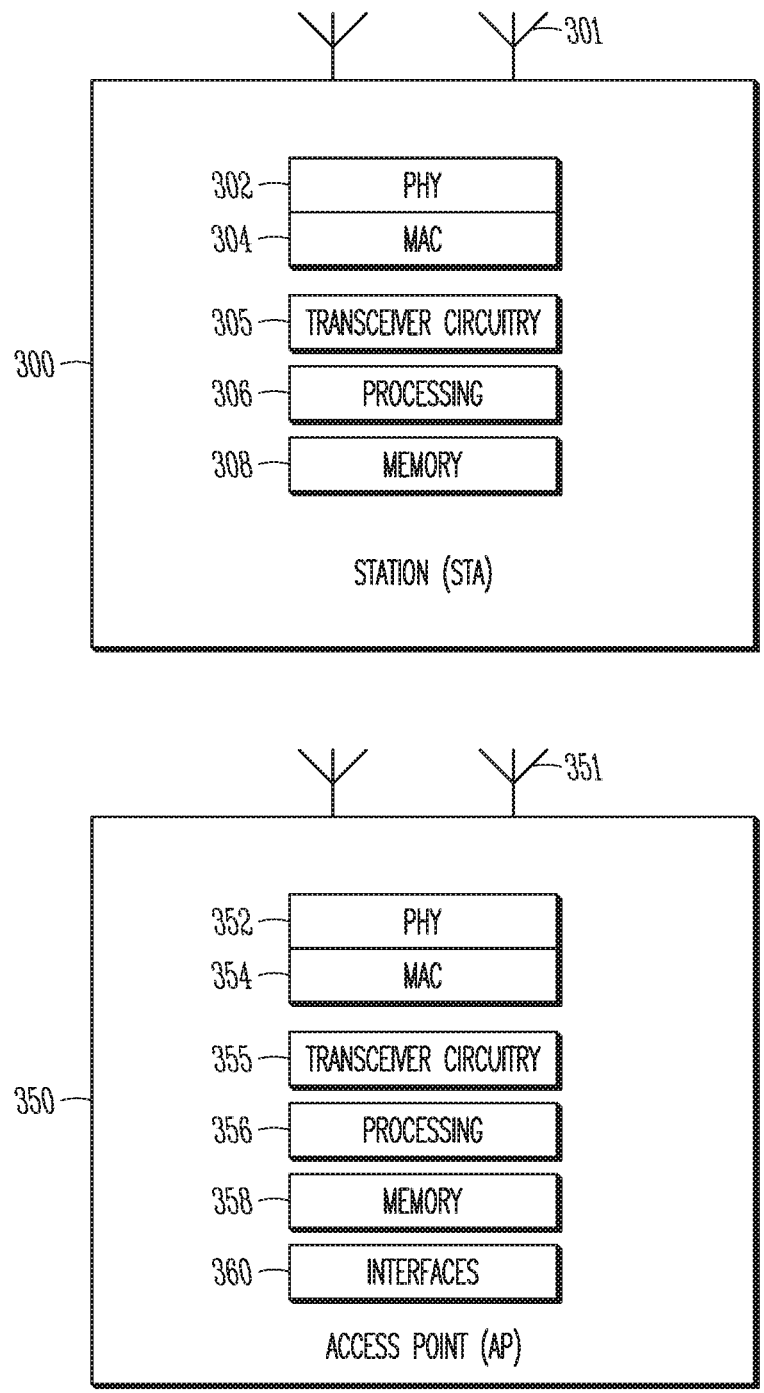
FIG. 3 illustrates a station (STA) in accordance with some embodiments and an access point (AP) in accordance with some embodiments.

FIG. 3 illustrates a station (STA) in accordance with some embodiments and an access point (AP) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control layer (MAC) circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control layer (MAC) circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HEW device 104 (FIG. 1), and may communicate using OFDM communication signals over a multicarrier communication channel. In some embodiments, the AP 350 may be configured to communicate using OFDM communication signals over a multicarrier communication channel. In some embodiments, the HEW device 104 may be configured to communicate using OFDM communication signals over a multicarrier communication channel. Accordingly, in some cases, the STA 300, AP 350 and/or HEW device 104 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the embodiments is not limited in this respect as they may also be suitable to transmit and/or receive communications in accordance with other techniques and standards. In some other embodiments, the AP 350, HEW device 104 and/or the STA 300 configured as an HEW device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

In accordance with some embodiments, the AP 102 may transmit an uplink (UL) sounding trigger frame (TF) that indicates a request to receive UL sounding elements from a group of one or more STAs 103. The AP 102 may receive UL sounding elements from the STAs 103 in accordance with UL multi-user multiple-input multiple-output (MU-MIMO) reception. The AP 102 may also receive, from at least a portion of the STAs 103, UL sounding feedback that includes one or more UL sounding transmission parameters used by the portion of the STAs 103 for UL sounding element transmissions. The UL sounding TF may further indicate the portion of the STAs 103 that are to transmit the UL sounding feedback. These embodiments will be described in more detail below.

Figure 4:
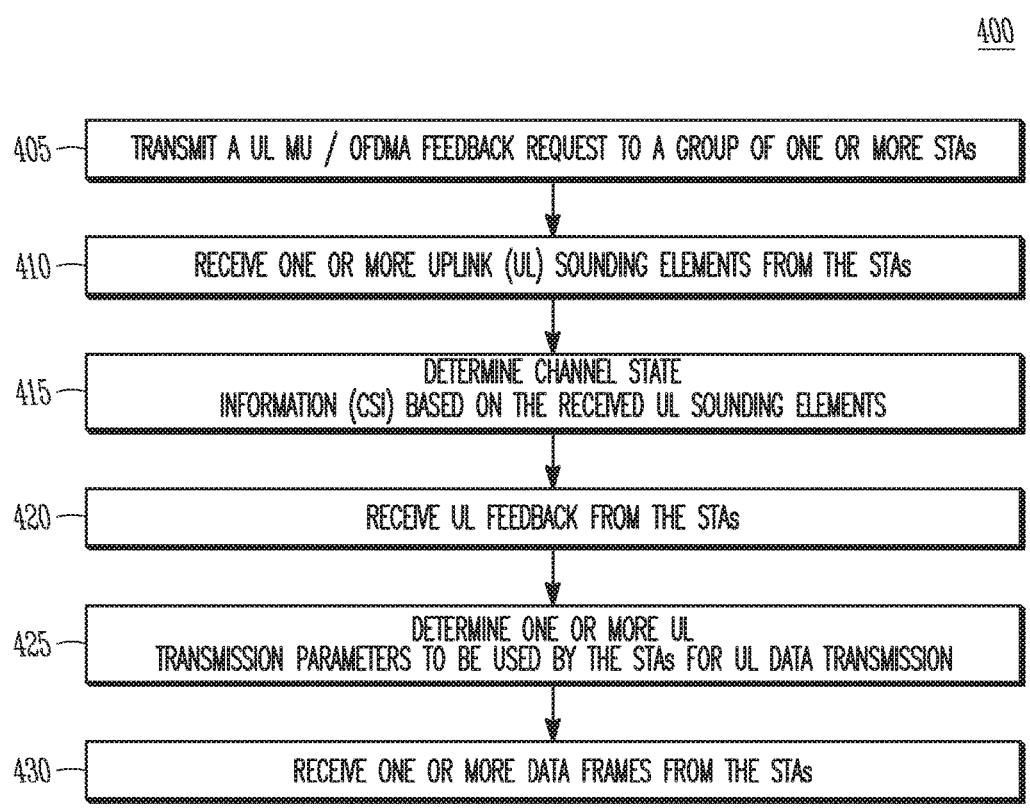
FIG. 4 illustrates the operation of a method of uplink sounding in accordance with some embodiments.

FIG. 4 illustrates the operation of a method of uplink sounding in accordance with some embodiments. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-11, although it is understood that the method 400 may be practiced with any other suitable systems, interfaces and components.

In some embodiments, the STA 103 may be configurable to operate as an HEW device 104. Although reference may be made to an STA 103 herein, including as part of the descriptions of the method 400 and/or other methods described herein, it is understood that an HEW device 104 and/or STA 103 configurable to operate as an HEW device 104 may be used in some embodiments. In addition, the method 400 and other methods described herein may refer to STAs 103, HEW devices 104 and/or APs 102 operating in accordance with one or more standards and/or protocols, such as 802.11, Wi-Fi, wireless local area network (W-LAN) and/or other, but embodiments of those methods are not limited to just those devices. In some embodiments, the method 400 and other methods described herein may be practiced by other mobile devices, such as an Evolved Node-B (eNB) or User Equipment (UE). The method 400 and other methods described herein may also be practiced by wireless devices configured to operate in other suitable types of wireless communication systems, including systems configured to operate according to various Third Generation Partnership Project (3GPP) Long Term Evolution (LTE) standards. The method 400 may also be applicable to an apparatus for an STA 103, HEW device 104 and/or AP 102 or other device described above, in some embodiments.

At operation 405 of the method 400, the AP 102 may transmit a UL sounding trigger frame (TF) to a group of STAs 103. In some embodiments, the AP 102 may encode the UL sounding TF for transmission, which may include one or more baseband transmitter operations such as encoding, scrambling, interleaving, bit-to-symbol mapping, addition of headers and/or others. As a non-limiting example, the UL sounding TF may be or may include a UL MU/OFDMA feedback request, which may be included in one or more standards.

The UL sounding TF may indicate information and/or parameters related to UL sounding by the STAs 103. Non-limiting examples are given below. As an example, the UL sounding TF may indicate a request, by the AP 102, to receive UL sounding elements from a group of one or more STAs 103. As another example, the UL sounding TF may indicate whether or not one or more of the STAs 103 are to transmit UL sounding feedback. For instance, the UL sounding feedback of a particular STA 103 may include information about the transmission of the UL sounding element by the STA 103, such as a number of UL transmit antennas used, a transmit power used and/or other information.

As a non-limiting example, a sounding element may be and/or may include a null data packet (NDP). The NDP may include a long training field, in some cases, although the scope of embodiments is not limited in this respect. As another non-limiting example, the sounding element may be and/or may include a frame with a limited MAC payload or no MAC payload.

It should be noted that references herein to a sounding element are not limiting. In some embodiments, sounding frames may be requested by the AP 102 and/or transmitted by the STA 103. Such sounding frames may include a sounding element, in some cases. In some embodiments, the AP 102 may request that the STA 103 transmit a frame, such as a medium access control (MAC) frame or other frame, which may include a sounding element. In some embodiments, a sounding element may be included in (and/or transported in) a MAC frame or other frame which may or may not be dedicated for usage in sounding operations.

As another example, the UL sounding TF may indicate, for a particular STA 103, whether UL sounding feedback transmitted by the particular STA 103 is to be included in a same UL frame used for an UL sounding element transmission by the particular STA 103. That is, the UL sounding TF may indicate whether a UL sounding element and UL sounding feedback for the UL sounding element are to be transmitted in the same UL frame (or in different UL frames in some cases). The UL sounding TF may indicate such information for multiple STAs 103 in some cases. As another example, the UL sounding TF may indicate, for a particular STA 103, whether the STA 103 is to transmit a UL data frame in a same UL frame used for an UL sounding element transmission. That is, the UL sounding TF may indicate whether a UL sounding element and a UL data frame are to be transmitted in the same UL frame. In some cases, a UL frame may include the UL sounding TF, UL sounding feedback, and a UL data frame.

As another example, the UL sounding TF may indicate one or more UL sounding transmission parameters that are to be included in the UL sounding feedback. In some cases, the UL sounding TF may indicate such information on a per STA 103 basis, in which different STAs 103 are requested to provide different types of UL sounding feedback. As another example, the UL sounding TF may indicate, to one or more STAs 103, channel resources (such as resource blocks (RBs) or other) that are to be used for the transmission of the UL sounding element and/or UL sounding feedback.

As another example, the UL sounding TF may indicate, from the group of STAs 103 that are to transmit UL sounding elements, a portion that is to transmit UL sounding feedback. That is, in some cases, the AP 102 may request UL sounding feedback from just a portion of the STAs 103. As another example, the UL sounding TF may indicate, from the group of STAs 103 that are to transmit UL sounding elements, a portion that is to transmit one or more UL data frames. That is, in some cases, the AP 102 may request UL sounding feedback from just a portion of the STAs 103.

At operation 410, the AP 102 may receive one or more UL sounding elements from one or more of the STAs 103. In some embodiments, the AP 102 may receive the UL sounding elements from the STAs in accordance with UL multi-user reception. As an example, the AP 102 may receive the UL sounding elements from the STAs in accordance with UL multi-user multiple-input multiple-output (MU-MIMO) reception. As another example, the AP 102 may decode UL sounding elements received from the STAs 103 in accordance with UL MU-MIMO reception. Accordingly, the decode operation may include operations such as correlation of a received signal with a known pattern and/or other operations, in some cases.

As an example, the AP 102 may use multiple antennas (such as 8 or other suitable number) and may dedicate each antenna for reception of a signal from an STA 103. This example is not limiting, however, as the AP 102 may use multiple antennas to receive a signal from an STA 103 in some cases. For instance, of 8 receiver antennas, the AP 102 may use two receiver antennas for reception of signals from each of 4 STAs 103. In some embodiments, the AP 102 may receive a UL MU-MIMO signal that is based on signals transmitted from the group of STAs 103 in accordance with UL MU-MIMO techniques. In this case, the signal from a particular STA 103 may be based on the UL sounding element transmitted by the STA 103, and the AP 102 may receive a composite of such signals from the group of STAs 103 (or a portion of the group in some cases).

In some embodiments, the UL sounding element transmitted by a particular STA 103 may include a null data packet (NDP), which may include fields such as a long training field (LTF) and/or other. Accordingly, in some embodiments, each STA 103 that transmits a UL sounding element may transmit an NDP. It should be noted that the NDP and/or LTF may be included in one or more 802.11 standards and/or other standards, but embodiments are not limited to usage of packets or fields that are included in standards. For instance, a known and/or determinable pattern of bits or symbols may be used.

At operation 415, the AP 102 may determine channel state information (CSI) based on the received UL sounding elements. As the LTF (and/or other pattern of bits or symbols) may be known and/or determinable by the AP 102, a correlation and/or other operation may be performed on the received signal to generate information such as UL CSI for one or more wireless links between the AP 102 and the STAs 103, a signal-to-noise ratio (SNR) and/or other channel quality information. Such information may be used, in some cases, to determine one or more UL data transmission parameters to be used for UL MU-MIMO data frame transmissions by the STAs 103. Examples of UL data transmission parameters may include, but are not limited to, a number of UL transmit antennas, a modulation and coding scheme (MCS) or a transmit power. For instance, an MCS to be used by a particular STA 103 for UL data frame transmissions may be determined based on channel quality information determined based on the UL sounding element of the particular STA 103. That is, a high throughput MCS may be used when the channel quality is determined to be relatively high and a low throughput MCS may be used when the channel quality is determined to be relatively low.

At operation 420, the AP 102 may receive UL sounding feedback from one or more of the STAs 103. In some embodiments, the AP 102 may receive the UL sounding feedback in accordance with UL multi-user multiple-input multiple-output (MU-MIMO) reception. In some embodiments, the AP 102 may decode the UL sounding elements received from the STAs 103. Accordingly, the decode operation may produce decoded bits, fields, parameters and/or information, in some cases.

In some embodiments, the UL sounding feedback may include information such as previously described. For instance, the UL sounding feedback of a particular STA 103 may include information about the transmission of the UL sounding element by the STA 103, such as a number of UL transmit antennas used, a transmit power used and/or other information. In some cases, other information may be included in the UL sounding feedback, such as a beam steering matrix based on a downlink reception at the STA 103, a DL signal to noise ratio (SNR) or DL channel state information (CSI).

As previously described, in some cases, the AP 102 may request the UL sounding feedback from a portion of the group of STAs 103 that transmit an UL sounding element. In some cases, the AP 102 may indicate that all of the STAs 103 are to transmit the UL sounding feedback. In some cases, the AP 102 may indicate that none of the STAs 103 are to transmit the UL sounding feedback.

In some cases, one or more of the UL sounding feedback elements received at operation 420 may be related to a previously received UL sounding element. That is, the AP 102 may indicate to one or more of the STAs 103 to transmit a UL sounding element in a first UL frame and to transmit UL sounding feedback for the UL sounding element in a second UL frame. In some cases, one or more of the UL sounding feedback elements received at operation 420 may be related to a UL sounding element received in a current UL frame. That is, the AP 102 may indicate to one or more of the STAs 103 to transmit a UL sounding element in a UL frame and to transmit UL sounding feedback for the UL sounding element in the same UL frame.

In some cases, mixed modes of operation may be used. As an example, the AP 102 may indicate that a portion of the STAs 103 are to transmit UL sounding feedback and that a portion of the STAs 103 are to refrain from transmission of UL sounding feedback. As another example, the AP 102 may indicate that a portion of the STAs 103 are to use a first format in which UL sounding feedback and a related UL sounding element are sent in a same UL frame, and that a portion of the STAs 103 are to use a second format in which UL sounding feedback and a related UL sounding element are sent in different UL frames. As another example, the AP 102 may indicate that a portion of the STAs 103 are to use a first format in which one or more UL data frames and a UL sounding element are sent in a same UL frame, and that a portion of the STAs 103 are to use a second format in which a UL sounding element is included in an UL frame without UL data frames.

At operation 425, the AP 102 may determine one or more UL data transmission parameters to be used by one or more STAs 103 for UL data frame transmissions. The determination of the UL data transmission parameters may be based on the reception of the UL sounding elements and/or UL sounding feedback, in some embodiments. In some embodiments, UL data transmission parameters may be determined on a per STA 103 basis, in which an UL sounding element and/or UL sounding feedback from a particular STA 103 may be used to determine one or more parameters for the STA 103. Embodiments are not limited as such, however, as UL data transmission parameters may be determined for multiple STAs 103, in some embodiments.

As an example, a UL CSI for a wireless link between the AP 102 and an STA 103, a signal-to-noise ratio (SNR) and/or other channel quality information may be determined, and one or more UL data transmission parameters to be used for UL MU-MIMO data frame transmissions by the STA 103 may be determined accordingly. Examples of UL data transmission parameters may include, but are not limited to, a number of UL transmit antennas, a modulation and coding scheme (MCS) or a transmit power. For instance, an MCS to be used by a particular STA 103 for UL data frame transmissions may be determined based on channel quality information determined based on the UL sounding element of the particular STA 103. That is, a high throughput MCS may be used when the channel quality is determined to be relatively high and a low throughput MCS may be used when the channel quality is determined to be relatively low.

In some embodiments, the AP 102 may transmit the determined UL data transmission parameters to the STAs 103 using any suitable techniques such as transmission of one or more control messages and/or other messages. For instance, the AP 102 may encode a control frame that includes the determined UL data transmission parameters. The control frame may be transmitted to one or more STAs 103, in some cases.

At operation 430, the AP 102 may receive one or more UL data frames from the STAs 103. In some embodiments, the AP 102 may decode one or more UL data frames received from the STAs 103. The UL data frames may be transmitted by the STAs 103 and/or received by the AP 102 in accordance with one or more of the UL data transmission parameters determined at operation 425, in some embodiments.

Figure 5:
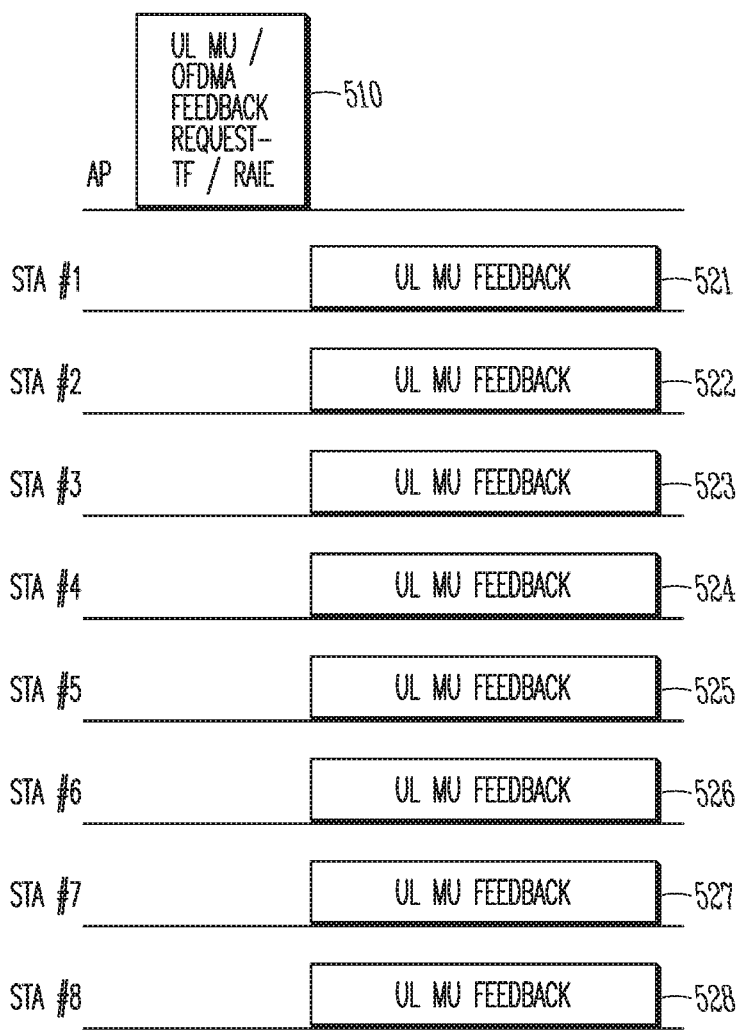
FIG. 5 illustrates an example of exchanging of a feedback request and feedback between an AP and an STA in accordance with some embodiments.
Figure 6:
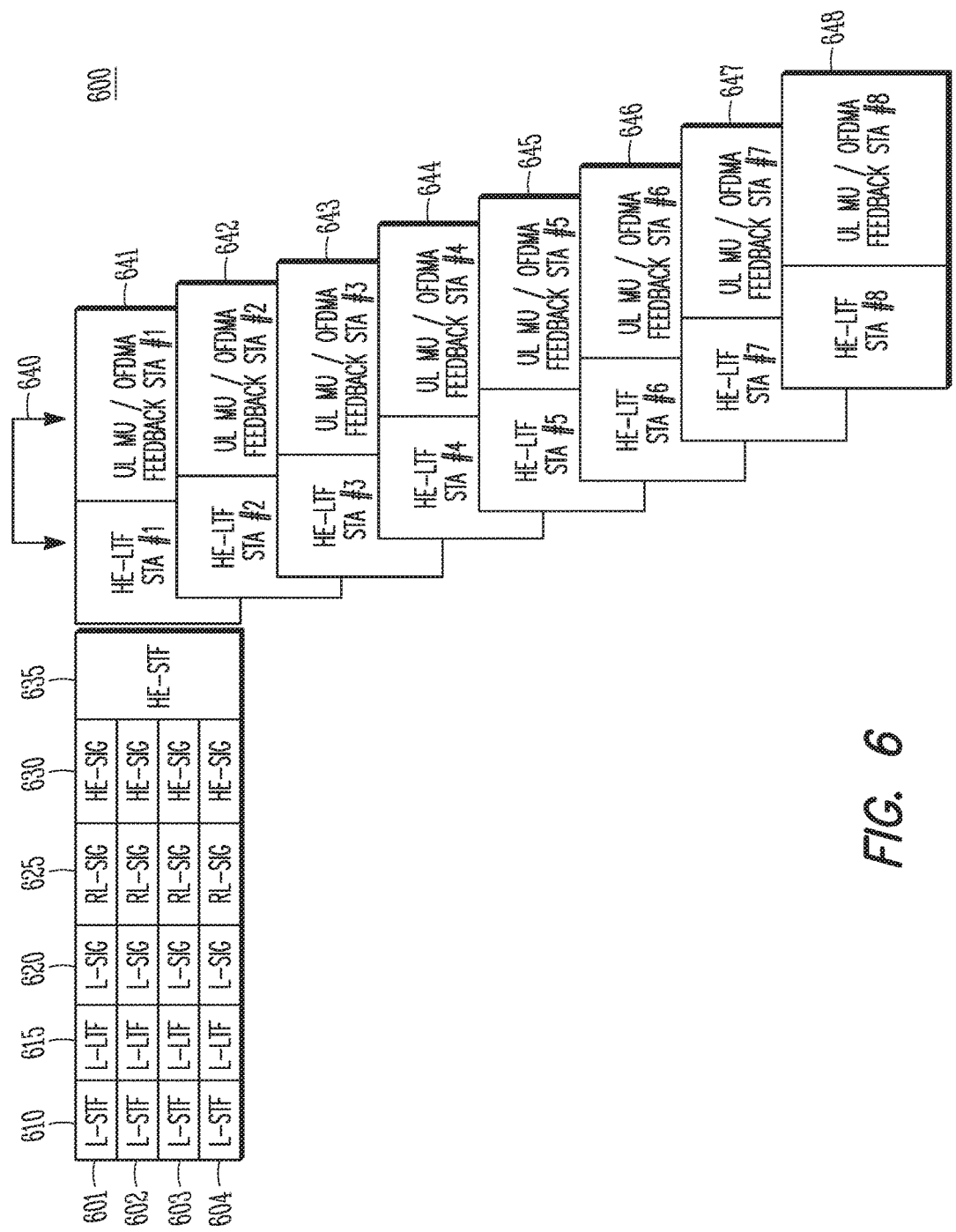
FIG. 6 illustrates an example of feedback in accordance with some embodiments.
Figure 7:
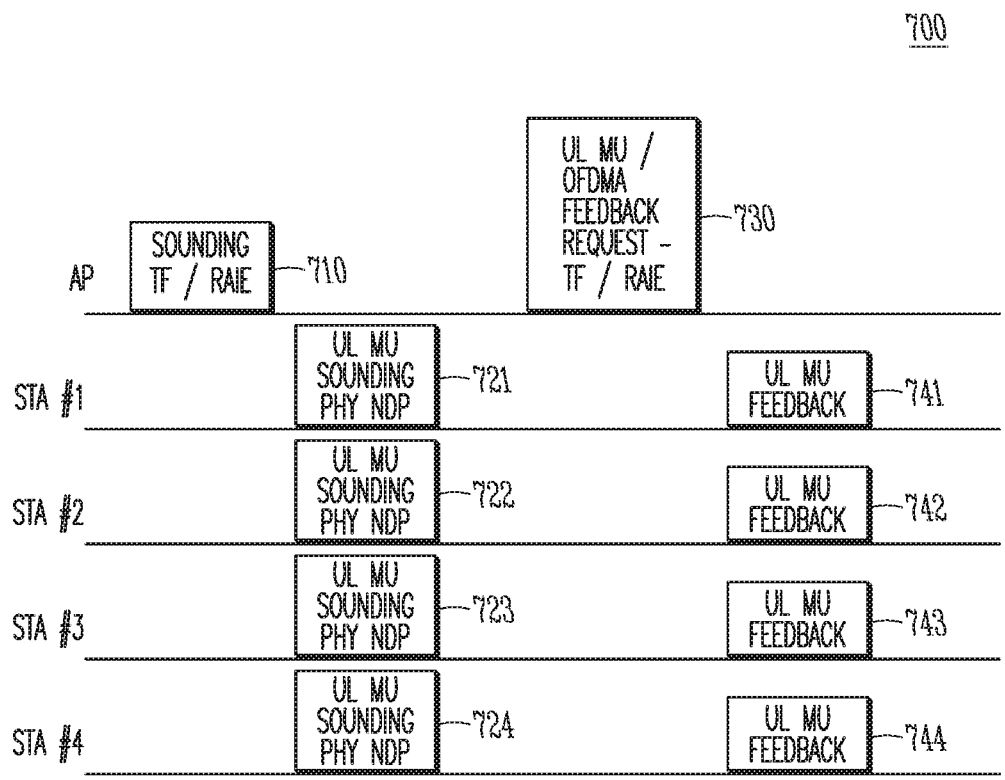
FIG. 7 illustrates another example of exchanging of a feedback request and feedback between an AP and an STA in accordance with some embodiments.
Figure 8:
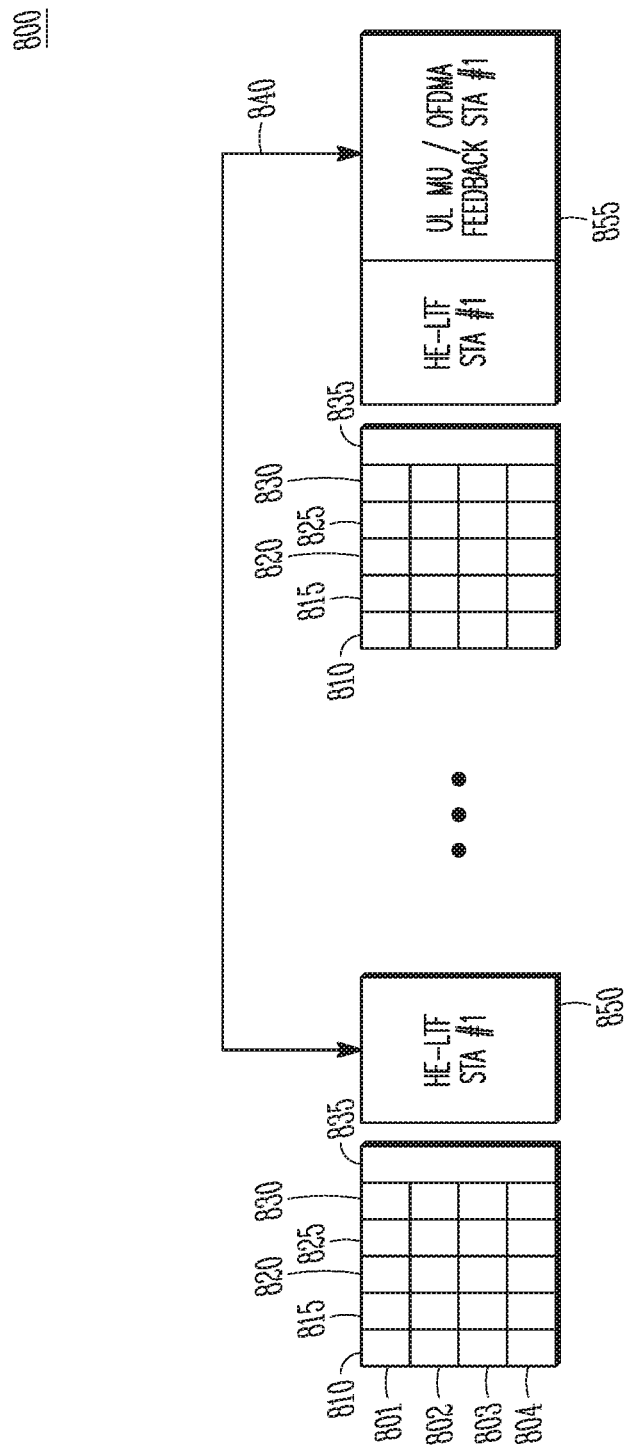
FIG. 8 illustrates another example of feedback in accordance with some embodiments.
Figure 9:
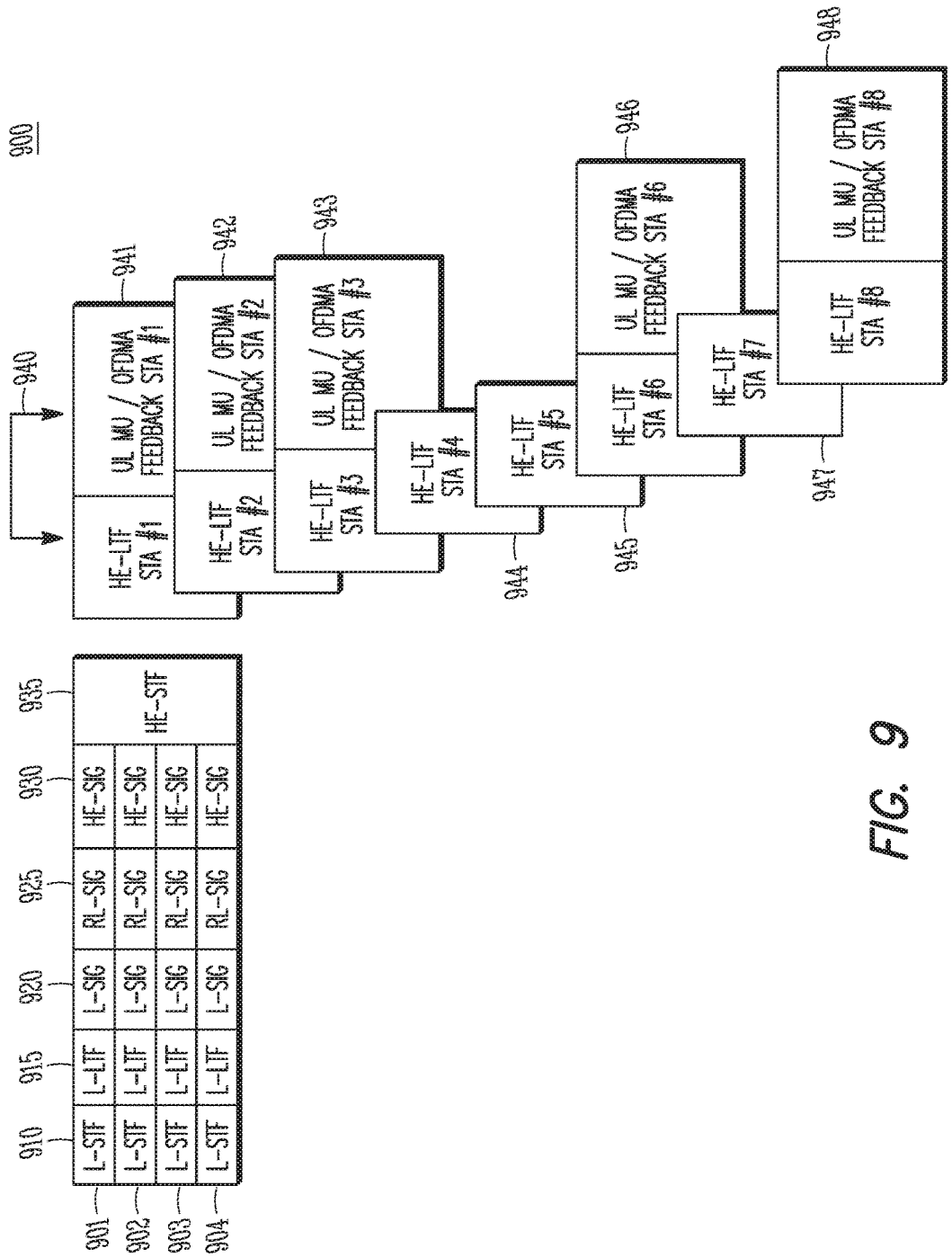
FIG. 9 illustrates another example of feedback in accordance with some embodiments.
Figure 10:
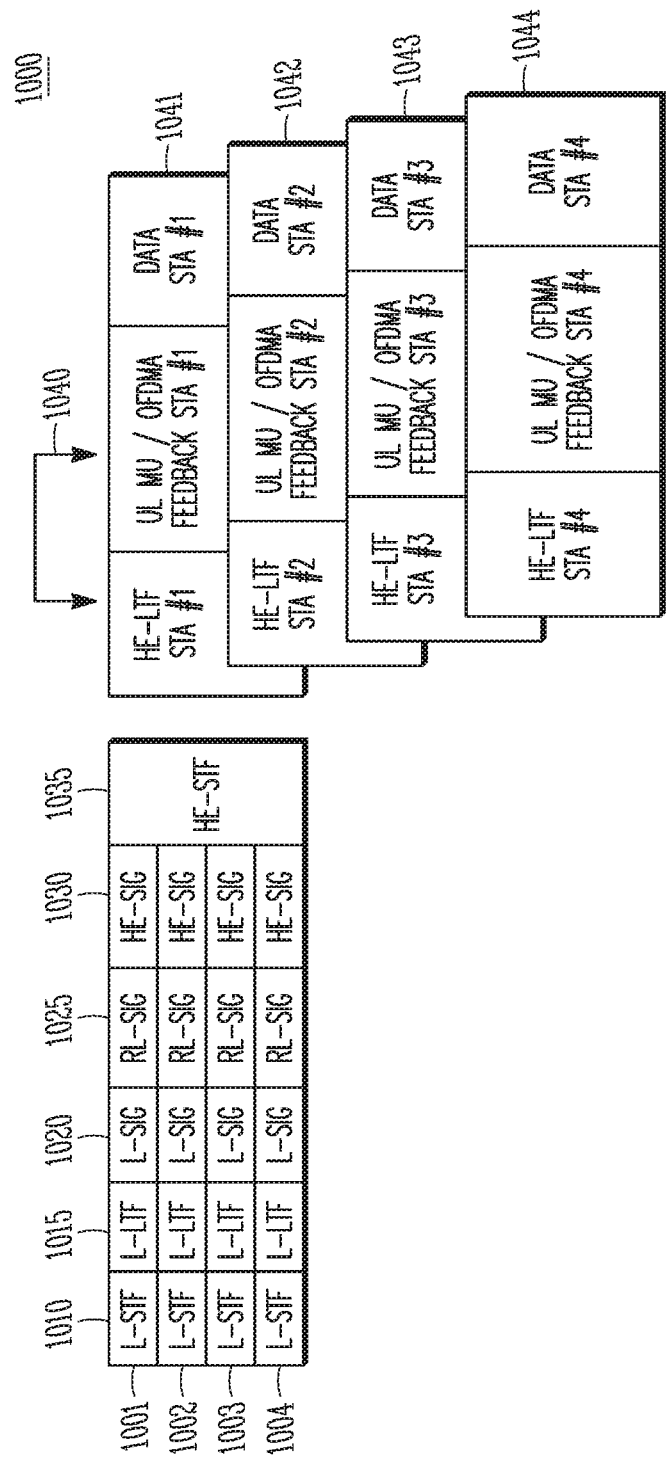
FIG. 10 illustrates another example of feedback in accordance with some embodiments.

FIG. 5 illustrates an example of exchanging of a feedback request and feedback between an AP and an STA in accordance with some embodiments. FIG. 6 illustrates an example of feedback in accordance with some embodiments. FIG. 7 illustrates another example of exchanging of a feedback request and feedback between an AP and an STA in accordance with some embodiments. FIGS. 8-10 illustrate other examples of feedback in accordance with some embodiments. It should be noted that the examples shown in FIGS. 5-10 may serve to illustrate some or all of the concepts and techniques described herein, but embodiments are not limited by the examples. For instance, embodiments are not limited by the number, type, arrangement and/or other aspects of the frames, signals, data blocks, and other elements as shown in FIGS. 5-10. In addition, embodiments are also not limited to the number of channels or STAs 103 used in any of the examples shown in FIGS. 5-10.

Referring to the example scenario 500 shown in FIG. 5, the AP 102 may transmit a trigger frame (TF) 510. In some embodiments, the TF 510 may indicate a request by the AP 102 to receive one or more UL sounding elements and/or UL sounding feedback from one or more STAs 103. As a non-limiting example, the TF 510 may be a "UL MU/OFDMA Feedback Request—TF/RAIE" which may be included in one or more standards. This example is not limiting, however, as any suitable frame/message may be transmitted to request the UL sounding elements and/or UL sounding feedback. In some embodiments, the TF 510 may indicate parameters and/or information regarding UL sounding by the STAs 103 and/or UL sounding feedback, including but not limited to parameters and/or information described herein. In addition, the UL sounding feedback may include such parameters and/or information, in some cases.

In the example scenario 500, the STAs #1-#8 may transmit UL MU feedback (labeled as 521-528 for STAs #1-#8, respectively). In some embodiments, a UL sounding element, NDP, LTF and/or other, may be transmitted along with the UL sounding feedback. Although embodiments are not limited as such, an STA 103 may transmit the UL sounding element before the UL sounding feedback. Accordingly, the UL sounding feedback and the UL sounding element may be transmitted within a same protocol data unit (PDU) and/or within a same UL frame, in some cases. As an example, the UL sounding element may be or may include a UL MU Sounding PHY NDP, which may be included in one or more standards.

Referring to the example scenario 600 shown in FIG. 6, transmission by multiple STAs 103 may be performed in a number of channels (four in this case, labeled as 601-604). For instance, four 20 MHz channels may be used for a bandwidth of 80 MHz. In this example 600, 8 STAs 103 labeled STA #1-#8 may transmit in accordance with MU-MIMO and/or OFDMA techniques. In some embodiments, the STA 103 may transmit one or more fields, such as the legacy STF (L-STF) 610, legacy LTF (L-LTF) 615, legacy SIG (L-SIG) 620, RL-SIG 625 and/or HE-SIG 630. As a non-limiting example, the STA 103 may transmit such fields on each channel 601-604. In some embodiments, the STA 103 may transmit an HE-STF 635. As a non-limiting example, the HE-STF 635 may be transmitted on aggregated channel resources that include the four channels 601-604, using techniques such as MU-MIMO, OFDMA and/or other techniques.

As shown in the example scenario 600, the 8 STAs 103 may transmit, in accordance with MU-MIMO, OFDMA and/or other techniques, uplink sounding elements (which may include an HE-LTF in some cases) and/or uplink sounding feedback (which may include UL MU/OFDMA feedback in some cases). As denoted by 641, STA #1 may transmit, in channel resources that include the four channels 601-604, an HE-LTF and UL MU/OFDMA feedback. The other STAs #2-#8 may perform similar transmissions as denoted by 642-648. It should be noted that the arrow 640 indicates that the UL sounding feedback refers to the UL sounding element in the same PDU and/or UL frame. For instance, the UL sounding feedback may include parameters and/or information that describe the transmission of the UL sounding element as indicated by 640.

Referring to the example scenario 700 shown in FIG. 7, the AP 102 may transmit a sounding trigger frame (TF) 710. In some embodiments, the TF 710 may indicate a request by the AP 102 to receive one or more UL sounding elements. As a non-limiting example, the sounding TF 710 may be a "Sounding TF/RAIE" which may be included in one or more standards. This example is not limiting, however, as any suitable frame/message may be transmitted to request the UL sounding elements. The STAs #1-#4 may transmit UL sounding elements (labeled 721-724, respectively). As a non-limiting example, a "UL MU Sounding PHY NDP" (which may be included in one or more standards) may be used. The AP 102 may transmit a TF 730 (such as a UL MU/OFDMA Feedback Request—TF/RAIE or other) that may indicate a request for UL sounding feedback. The STAs #1-#4 may transmit such UL feedback as indicated by 741-744.

In some embodiments, the usage of the sounding TF 710 (in contrast to the UL MU/OFDMA Feedback Request—TF/RAIE used in the example scenario 500 shown in FIG. 5) may indicate that the STAs 103 are to send the UL sounding element but are not to send UL sounding feedback. For instance, the STAs 103 may respond to reception of the sounding TF 710 by sending the UL sounding element without UL feedback. In some cases (such as shown in the example scenario 500 in FIG. 5), the STAs 103 may respond to reception of TFs such as the UL MU/OFDMA Feedback Request—TF/RAIE by sending the UL sounding element and UL sounding feedback. In some cases, reception of the UL MU/OFDMA Feedback Request—TF/RAIE after a reception of a sounding TF may indicate to the STAs 103 to transmit the UL sounding feedback related to the UL sounding element (that was transmitted in response to the reception of the sounding TF).

Referring to FIGS. 8-10, various formats that may be used, in some embodiments, for transmission of UL sounding elements and/or UL sounding feedback are shown. In some embodiments, the AP 102 may indicate such formats in one or more TFs, such as the UL MU/OFDMA Feedback Request—TF/RAIE and/or others. In some embodiments, such formats may be indicated in a control message, configuration message and/or other message exchanged between the AP 102 and STAs 103.

In the example scenario 800 in FIG. 8, transmission of a UL sounding element and UL sounding feedback is shown. It should be noted that only the transmissions by STA #1 are shown for simplicity of illustration, but more than one STA may perform similar transmissions in some cases. The elements 810-835 (which may be similar to elements 610-635 shown in FIG. 6, in some cases) may be transmitted by STA #1 in a first UL frame, along with a UL sounding element 850. The UL sounding feedback 855 may be transmitted in a second UL frame subsequent to the first UL frame. It should be noted that embodiments are not limited to transmission of the UL sounding feedback in a UL frame that immediately follows the UL frame in which the UL sounding element is transmitted.

In the example scenario 900 in FIG. 9, a portion (#1, 2, 3, 6, and 8) of STAs #1-#8 may transmit a UL sounding element and UL sounding feedback while a portion (#4, 5, and 7) may transmit a UL sounding element without transmission of a UL sounding feedback.

In the example scenario 1000 in FIG. 10, the STAs #1-#4 may transmit a UL sounding element, UL sounding feedback, and a UL data frame within a current UL frame. It should be noted that mixed modes of operation may be used in some embodiments. For instance, in some cases, a portion of the STAs #1-#4 may transmit a UL data frame while another portion may not necessarily transmit a UL data frame.

In some embodiments, a TF/RAIE (such as the TF/RAIE 510 and/or others) may indicate a request, by the AP 102, for one or more parameters and/or information from one or more STAs 103 as part of UL sounding feedback. As an example, the TF may indicate a request for a transmission limitation parameter of an STA 103, which may refer to a sounding element (such as an NDP, LTF or other) to be transmitted by the STA 103. For instance, a transmit power limit per MCS may be transmitted as part of the UL sounding feedback. As another example, the TF may indicate a request for temporary limits of an STA 103, such as a transmit power limit per MCS and/or a number of allocated resource units (RUs), which may be based on regulatory reasons, a transmit EVM level per MCS, power and/or other factors. As another example, the TF/RAIE may indicate a request for an applicable transmission format and/or allocated resources, such as a number of antennas in use per MCS/Nss. As another example, the TF/RAIE may indicate a request for a current operation mode of the STA 103, a possible operation mode of the STA 103. For instance, the operation mode may be related to usage of CSD or may be related to a spatial expansion per Nss.

It should be noted that these examples of information that may be requested by the TF/RAIE are not limiting. In addition, the STA 103 may also send other information to the AP 102, which may or may not be related to the UL reference sounding element. For instance, channel state information (CSI) of the downlink, a signal-to-noise ratio (SNR) on the downlink, channel measurement metrics on the downlink, a number of receive antennas used by the STA 103, a steering matrix used by the STA 103, a request for uplink resources for the STA and/or other information may be sent to the AP 102 by the STA 103. Such information may or may not have been requested by the AP 102.

It should be noted that the TF/RAIE may indicate a request for such information from one or more STAs 103, a particular STA 103 or a group of STAs 103, in some cases. In addition, in some cases, the AP 102 may negotiate and/or re-negotiate such information for one or more STAs 103 before sending the TF/RAIE.

It should also be noted that in some cases, frames and/or elements may be transmitted in accordance with contention based techniques. In some embodiments, a transmission of a frame and/or element may be performed after detection of an inactivity period of the channel to be used for the transmission. For instance, it may be determined, based on channel sensing, that the channel is available. As a non-limiting example, a minimum time duration for the inactivity period may be based on an inter-frame spacing (IFS), which may be included in an 802.11 standard and/or other standard. That is, when inactivity is detected for a time duration that is greater than or equal to the IFS, the channel may be determined to be available. Embodiments are not limited to usage of the IFS, however, as other time durations, which may or may not be included in a standard, may be used in some cases.

Figure 11:
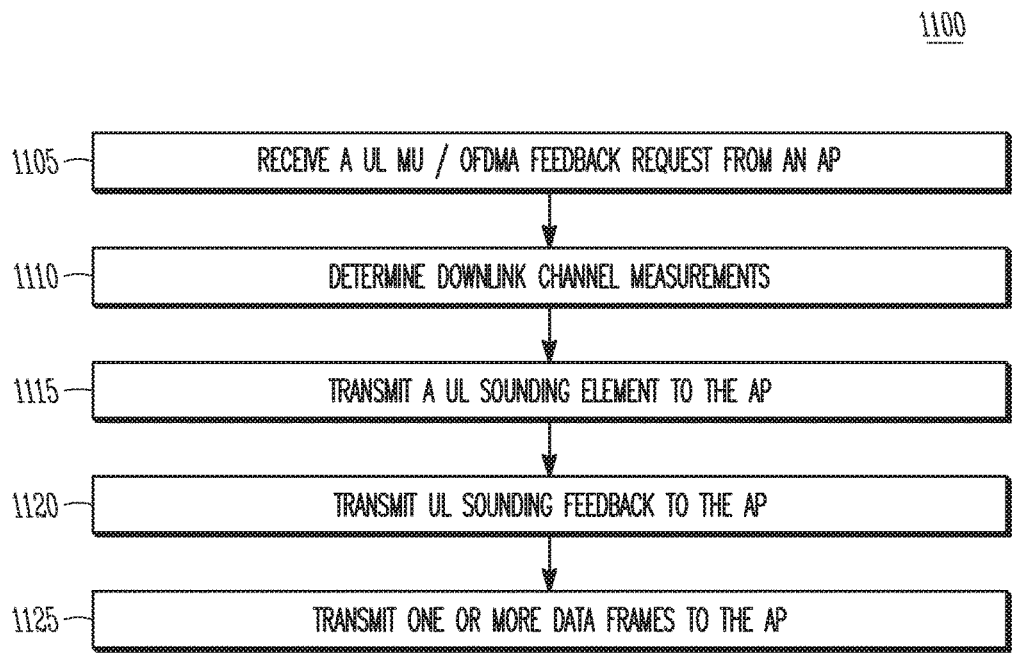
FIG. 11 illustrates the operation of another method of uplink sounding in accordance with some embodiments.

FIG. 11 illustrates the operation of another method of communication in accordance with some embodiments. As mentioned previously regarding the method 400, embodiments of the method 1100 may include additional or even fewer operations or processes in comparison to what is illustrated in FIG. 11 and embodiments of the method 1100 are not necessarily limited to the chronological order that is shown in FIG. 11. In describing the method 1100, reference may be made to FIGS. 1-10, although it is understood that the method 1100 may be practiced with any other suitable systems, interfaces and components. In addition, embodiments of the method 1100 may be applicable to APs 102, STAs 103, UEs, eNBs or other wireless or mobile devices. The method 1100 may also be applicable to an apparatus for an AP 102, STA 103 and/or other device described above.

It should be noted that the method 1100 may be practiced at an STA 103 and may include exchanging of frames, signals and/or messages with an AP 102. Similarly, the method 400 may be practiced at an AP 102 and may include exchanging of frames, signals and/or messages with an STA 103. In some cases, operations and techniques described as part of the method 400 may be relevant to the method 1100. In addition, embodiments of the method 1100 may include operations performed at the STA 103 that are reciprocal or similar to other operations described herein performed at the AP 102. For instance, an operation of the method 1100 may include reception of a frame from the AP 102 by the STA 103 while an operation of the method 400 may include transmission of the same frame or similar frame by the AP 102.

In addition, previous discussion of various techniques and concepts may be applicable to the method 1100 in some cases, including UL sounding, UL sounding TF, UL sounding element, UL sounding feedback, UL data frames, UL MU-MIMO, channel quality measurements, UL sounding transmission parameters, DL channel measurements, NDP, LTF and/or others. In addition, the example arrangements of feedback requests, feedback and/or sounding shown in FIGS. 5-10 may also be applicable, in some cases, although the scope of embodiments is not limited in this respect.

At operation 1105, the STA 103 may receive a UL sounding TF from the AP 102. In some embodiments, the STA 103 may decode a UL sounding TF received from the AP 102. At operation 1110, the STA 103 may determine one or more downlink channel measurements, including but not limited to those described herein. At operation 1115, the STA 103 may transmit a UL sounding element to the AP 102. In some embodiments, the STA 103 may encode the UL sounding element for transmission to the AP 102. In some embodiments, the UL sounding element may be transmitted in accordance with multi-user techniques, such as UL MU-MIMO techniques, OFDMA techniques and/or other techniques, although the scope of embodiments is not limited in this respect.

At operation 1120, the STA 103 may transmit UL sounding feedback to the AP 102. In some embodiments, the STA 103 may encode the UL sounding feedback for transmission to the AP 102. In some embodiments, the transmission of the UL sounding feedback and/or the encoding of the UL sounding feedback for transmission may be performed when the UL sounding TF indicates that the STA 103 is to transmit UL sounding feedback.

At operation 1125, the STA 103 may transmit one or more UL data frames to the AP 102. In some embodiments, the STA 103 may encode one or more UL data frames for transmission to the AP 102. In some embodiments, the UL data frames may be transmitted in accordance with one or more UL data transmission parameters for the STA 103. Such UL data transmission parameters may be determined by the AP 102 based on the UL sounding element and/or UL sounding feedback transmitted by the STA 103, in some cases. In addition, the STA 103 may receive one or more control messages and/or other messages that may indicate the UL data transmission parameters, in some cases. The STA 103 may decode one or more received control messages and/or other received messages that may indicate the UL data transmission parameters, in some cases.

In Example 1, an apparatus for an access point (AP) may comprise memory and processing circuitry configured to encode an uplink (UL) sounding trigger frame (TF) for transmission that indicates a request to receive UL sounding elements from a group of one or more stations (STAs). The processing circuitry may be further configured to decode the UL sounding elements received from the STAs in accordance with UL multi-user reception. The processing circuitry may be further configured to decode UL sounding feedback received from at least a portion of the STAs that includes one or more UL sounding transmission parameters used by the portion of the STAs for UL sounding element transmissions. The UL sounding TF may further indicate the portion of the STAs that are to transmit the UL sounding feedback.

In Example 2, the subject matter of Example 1, wherein the UL sounding element may include a null data packet (NDP) that includes a long training field (LTF).

In Example 3, the subject matter of one or any combination of Examples 1-2, wherein the UL sounding TF may further indicate the UL sounding transmission parameters that are to be included in the UL sounding feedback.

In Example 4, the subject matter of one or any combination of Examples 1-3, wherein the UL sounding transmission parameters indicated by the UL sounding TF may be in a group that includes a number of UL transmit antennas used for the UL sounding element transmissions or transmit powers used for the UL sounding element transmissions.

In Example 5, the subject matter of one or any combination of Examples 1-4, wherein the UL sounding TF may further indicate, for at least one of the STAs, whether UL sounding feedback transmitted by the STA is to be included in a same UL frame used for an UL sounding element transmission.

In Example 6, the subject matter of one or any combination of Examples 1-5, wherein the UL sounding TF may further indicate, for at least one of the STAs, whether the STA is to transmit a UL data frame in a same UL frame used for an UL sounding element transmission.

In Example 7, the subject matter of one or any combination of Examples 1-6, wherein the processing circuitry may be further configured to determine, based at least partly on the received UL sounding elements, one or more UL data transmission parameters to be used for UL MU-MIMO data frame transmissions by the STAs. The processing circuitry may be further configured to encode a downlink control frame for transmission to the STAs that is based on the UL data transmission parameters. The processing circuitry may be further configured to decode one or more data frames received in accordance with the determined UL data transmission parameters.

In Example 8, the subject matter of one or any combination of Examples 1-7, wherein the UL data transmission parameters may be in a group that includes a number of UL transmit antennas, a modulation and coding scheme (MCS) or a transmit power.

In Example 9, the subject matter of one or any combination of Examples 1-8, wherein the processing circuitry may include a baseband processor to encode the UL sounding TF.

In Example 10, the subject matter of one or any combination of Examples 1-9, wherein the processing circuitry may be further configured to determine, based at least partly on the received UL sounding elements, UL channel state information (CSI) for one or more wireless links between the AP and the STAs.

In Example 11, the subject matter of one or any combination of Examples 1-10, wherein for at least one of the STAs, the UL sounding feedback may include a beam steering matrix based on a downlink reception at the STA.

In Example 12, the subject matter of one or any combination of Examples 1-11, wherein for at least one of the STAs, the UL sounding element received from the STA may be included in a first UL frame and UL sounding feedback received from the STA may be included in a second, subsequent UL frame.

In Example 13, the subject matter of one or any combination of Examples 1-12, wherein the AP may be arranged to operate in accordance with a wireless local area network (WLAN) protocol.

In Example 14, the subject matter of one or any combination of Examples 1-13, wherein the apparatus may further include a transceiver to transmit the UL sounding TF, to receive the UL sounding elements, and to receive the UL sounding feedback.

In Example 15, the subject matter of one or any combination of Examples 1-14, wherein the UL sounding elements may be received in accordance with multi-user multiple-input multiple-output (MU-MIMO) reception or orthogonal frequency division multiple access (OFDMA) reception.

In Example 16, a non-transitory computer-readable storage medium may store instructions for execution by one or more processors to perform operations for communication by an access point (AP). The operations may configure the one or more processors to encode an uplink (UL) sounding trigger frame (TF) for transmission that indicates a request to receive UL sounding elements from a group of STAs. The operations may further configure the one or more processors to decode a received UL multi-user multiple-input multiple-output (MU-MIMO) signal based on UL sounding elements from the group of STAs. The operations may further configure the one or more processors to determine, based at least partly on the UL sounding elements, a UL data transmission parameter to be used by an STA in the group for UL data transmissions. The operations may further configure the one or more processors to decode one or more data frames received from the STA in accordance with the determined UL data transmission parameter.

In Example 17, the subject matter of Example 16, wherein the sounding TF may further indicate a portion of the STAs in the group that are to transmit UL sounding feedback. The operations may further configure the one or more processors to decode the UL sounding feedback received from the portion of the STAs. For at least one of the STAs, the UL sounding feedback from the STA may be based on UL sounding transmission parameters used by the STA for a UL sounding element transmission.

In Example 18, the subject matter of one or any combination of Examples 16-17, wherein the sounding TF may further indicate, for at least one of the STAs, whether UL sounding feedback from the STA is to be transmitted in a same UL frame used for a UL sounding element transmission by the STA.

In Example 19, the subject matter of one or any combination of Examples 16-18, wherein the sounding TF may further indicate, for at least one of the STAs, whether the STA is to transmit a UL data frame in a same UL frame used for a UL sounding element transmission by the STA.

In Example 20, a method may comprise encoding an uplink (UL) sounding trigger frame (TF) for transmission that indicates a request to receive UL sounding elements from a group of one or more stations (STAs). The method may further comprise decoding UL sounding elements received from the STAs in accordance with UL multi-user multiple-input multiple-output (MU-MIMO) reception. The method may further comprise decoding UL sounding feedback received from at least a portion of the STAs that includes one or more UL sounding transmission parameters used by the portion of the STAs for UL sounding element transmissions. The UL sounding TF may further indicate the portion of the STAs that are to transmit the UL sounding feedback.

In Example 21, the subject matter of Example 20, wherein the UL sounding TF may further indicate the UL sounding transmission parameters that are to be included in the UL sounding feedback. The UL sounding transmission parameters indicated by the UL sounding TF may be in a group that includes a number of UL transmit antennas used for the UL sounding element transmissions or transmit powers used for the UL sounding element transmissions.

In Example 22, an apparatus for a station (STA) may comprise memory and processing circuitry configured to decode an uplink (UL) sounding trigger frame (TF) received from an access point (AP) that indicates a request to receive a UL sounding element from the STA. The processing circuitry may be further configured to encode the UL sounding element for transmission in accordance with UL multi-user multiple-input multiple-output (MU-MIMO) transmission. The processing circuitry may be further configured to determine, based on the UL sounding TF, whether the STA is to transmit UL sounding feedback that includes one or more UL sounding transmission parameters related to the transmission of the UL sounding element. The processing circuitry may be further configured to encode the UL sounding feedback for transmission in accordance with the UL MU-MIMO transmission when the UL sounding TF indicates that the STA is to transmit the UL sounding feedback.

In Example 23, the subject matter of Example 22, wherein the UL sounding transmission parameters may be indicated by the UL sounding TF.

In Example 24, the subject matter of one or any combination of Examples 22-23, wherein the UL sounding transmission parameters indicated by the UL sounding TF may be in a group that includes a number of UL transmit antennas used for the UL sounding element transmissions or transmit powers used for the UL sounding element transmissions.

In Example 25, the subject matter of one or any combination of Examples 22-24, wherein the UL sounding TF may further indicate whether the UL sounding feedback is to be transmitted, by the STA, in a same UL frame used for the transmission of the UL sounding element or in a subsequent UL frame.

In Example 26, the subject matter of one or any combination of Examples 22-25, wherein the UL sounding TF may further indicate whether the STA is to transmit a UL data frame in a same UL frame used for the transmission of the UL sounding element. The processing circuitry may be further configured to encode the UL data frame for transmission when indicated by the UL sounding TF.

In Example 27, the subject matter of one or any combination of Examples 22-26, wherein the processing circuitry may be further configured to determine, based at least partly on the UL sounding TF received from the AP, one or more DL channel measurements. The processing circuitry may be further configured to include the DL channel measurements in the UL sounding feedback.

In Example 28, the subject matter of one or any combination of Examples 22-27, wherein the processing circuitry may include a baseband processor to decode the UL sounding TF.

In Example 29, the subject matter of one or any combination of Examples 22-28, wherein the DL channel measurements may be in a group that includes a beam steering matrix based on a DL reception at the STA, a DL signal to noise ratio (SNR) or DL channel state information (CSI).

In Example 30, the subject matter of one or any combination of Examples 22-29, wherein the UL sounding element may include a null data packet (NDP) that includes a long training field (LTF).

In Example 31, the subject matter of one or any combination of Examples 22-30, wherein the STA may be arranged to operate in accordance with a wireless local area network (WLAN) protocol.

In Example 32, the subject matter of one or any combination of Examples 22-31, wherein the apparatus may further include a transceiver to receive the UL sounding TF, to transmit the UL sounding element, and to transmit the UL sounding feedback.

In Example 33, an apparatus for an access point (AP) may comprise means for encoding an uplink (UL) sounding trigger frame (TF) for transmission that indicates a request to receive UL sounding elements from a group of one or more stations (STAs). The apparatus may further comprise means for decoding UL sounding elements received from the STAs in accordance with UL multi-user multiple-input multiple-output (MU-MIMO) reception. The apparatus may further comprise means for decoding UL sounding feedback received from at least a portion of the STAs that includes one or more UL sounding transmission parameters used by the portion of the STAs for UL sounding element transmissions. The UL sounding TF may further indicate the portion of the STAs that are to transmit the UL sounding feedback.

In Example 34, the subject matter of Example 33, wherein the UL sounding TF may further indicate the UL sounding transmission parameters that are to be included in the UL sounding feedback. The UL sounding transmission parameters indicated by the UL sounding TF may be in a group that includes a number of UL transmit antennas used for the UL sounding element transmissions or transmit powers used for the UL sounding element transmissions.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an access point (AP), the apparatus comprising memory and processing circuitry configured to:
   encode an uplink (UL) sounding trigger frame (TF) for transmission that indicates a request to receive UL sounding elements from a group of stations (STAs);
   decode the UL sounding elements received from the STAs in accordance with UL multi-user reception;
   decode UL sounding feedback received from at least a portion of the STAs that includes one or more UL sounding transmission parameters used by the portion of the STAs for UL sounding element transmissions,
   wherein the UL sounding TF further indicates the portion of the STAs that are to transmit the UL sounding feedback;
   determine, based at least partly on the received UL sounding elements, one or more UL data transmission parameters to be used for UL MU-MIMO data frame transmissions by the STAs;
   encode a downlink control frame for transmission to the STAs that is based on the UL data transmission parameters; and
   decode one or more data frames received in accordance with the determined UL data transmission parameters.

2. The apparatus according to claim 1, wherein the UL sounding element includes a null data packet (NDP) that includes a long training field (LTF).

3. The apparatus according to claim 1, wherein the UL sounding TF further indicates the UL sounding transmission parameters that are to be included in the UL sounding feedback.

4. The apparatus according to claim 3, wherein the UL sounding transmission parameters indicated by the UL sounding TF are in a group that includes a number of UL transmit antennas used for the UL sounding element transmissions or transmit powers used for the UL sounding element transmissions.

5. The apparatus according to claim 1, wherein the UL sounding TF further indicates, for at least one of the STAs, whether UL sounding feedback transmitted by the STA is to be included in a same UL frame used for an UL sounding element transmission.

6. The apparatus according to claim 1, wherein the UL sounding TF further indicates, for at least one of the STAs, whether the STA is to transmit a UL data frame in a same UL frame used for an UL sounding element transmission.

7. The apparatus according to claim 1, wherein the UL data transmission parameters are in a group that includes a number of UL transmit antennas, a modulation and coding scheme (MCS) or a transmit power.

8. The apparatus according to claim 1, wherein the processing circuitry includes a baseband processor to encode the UL sounding TF.

9. The apparatus according to claim 1, the processing circuitry further configured to determine, based at least partly on the received UL sounding elements, UL channel state information (CSI) for one or more wireless links between the AP and the STAs.

10. The apparatus according to claim 1, wherein for at least one of the STAs, the UL sounding feedback includes a beam steering matrix based on a downlink reception at the STA.

11. The apparatus according to claim 1, wherein for at least one of the STAs, the UL sounding element received from the STA is included in a first UL frame and UL sounding feedback received from the STA is included in a second, subsequent UL frame.

12. The apparatus according to claim 1, wherein the AP is arranged to operate in accordance with a wireless local area network (WLAN) protocol.

13. The apparatus according to claim 1, wherein the apparatus further includes a transceiver to transmit the UL sounding TF, to receive the UL sounding elements, and to receive the UL sounding feedback.

14. The apparatus according to claim 13, wherein the UL sounding elements are received in accordance with multi-user multiple-input multiple-output (MU-MIMO) reception or orthogonal frequency division multiple access (OFDMA) reception.

15. A non-transitory computer-readable storage medium that stores instructions for execution by one or more processors to perform operations for communication by an access point (AP), the operations to configure the one or more processors to:
   encode an uplink (UL) sounding trigger frame (TF) for transmission that indicates a request to receive UL sounding elements from a group of STAs;
   decode a received UL multi-user multiple-input multiple-output (MU-MIMO) signal based on UL sounding elements from the group of STAs;
   determine, based at least partly on the UL sounding elements, a UL data transmission parameter to be used by an STA in the group for UL data transmissions; and
   decode one or more data frames received from the STA in accordance with the determined UL data transmission parameter.

16. The non-transitory computer-readable storage medium according to claim 15, wherein:
   the sounding TF further indicates a portion of the STAs in the group that are to transmit sounding feedback,
   the operations are to further configure the one or more processors to decode the UL sounding feedback received from the portion of the STAs, and
   for at least one of the STAs, the UL sounding feedback from the STA is based on UL sounding transmission parameters used by the STA for a UL sounding element transmission.

17. The non-transitory computer-readable storage medium according to claim 15, wherein the sounding TF further indicates, for at least one of the STAs, whether UL sounding feedback from the STA is to be transmitted in a same UL frame used for a UL sounding element transmission by the STA.

18. The non-transitory computer-readable storage medium according to claim 15, wherein the sounding TF further indicates, for at least one of the STAs, whether the STA is to transmit a UL data frame in a same UL frame used for a UL sounding element transmission by the STA.

19. A method of uplink (UL) sounding, the method comprising:
   encoding an uplink (UL) sounding trigger frame (TF) for transmission that indicates a request to receive UL sounding elements from a group of stations (STAs);

decoding UL sounding elements received from the STAs in accordance with UL multi-user multiple-input multiple-output (MU-MIMO) reception; and decoding UL sounding feedback received from at least a portion of the STAs that includes one or more UL sounding transmission parameters used by the portion of the STAs for UL sounding element transmissions, wherein the UL sounding TF further indicates the portion of the STAs that are to transmit the UL sounding feedback.

20. The method according to claim 19, wherein:
the UL sounding TF further indicates the UL sounding transmission parameters that are to be included in the UL sounding feedback, and
the UL sounding transmission parameters indicated by the UL sounding TF are in a group that includes a number of UL transmit antennas used for the UL sounding element transmissions or transmit powers used for the UL sounding element transmissions.

21. An apparatus for a station (STA), the apparatus comprising memory and processing circuitry configured to:
decode an uplink (UL) sounding trigger frame (TF) received from an access point (AP) that indicates a request to receive a UL sounding element from the STA;
encode the UL sounding element for transmission in accordance with UL multi-user multiple-input multiple-output (MU-MIMO) transmission;
determine, based on the UL sounding TF, whether the STA is to transmit UL sounding feedback that includes one or more UL sounding transmission parameters related to the transmission of the UL sounding element; and
encode the UL sounding feedback for transmission in accordance with the UL MU-MIMO transmission when the UL sounding TF indicates that the STA is to transmit the UL sounding feedback.

22. The apparatus according to claim 21, wherein the UL sounding transmission parameters are indicated by the UL sounding TF.

23. The apparatus according to claim 22, wherein the UL sounding transmission parameters indicated by the UL sounding TF are in a group that includes a number of UL transmit antennas used for the UL sounding element transmissions or transmit powers used for the UL sounding element transmissions.

24. The apparatus according to claim 21, wherein the UL sounding TF further indicates whether the UL sounding feedback is to be transmitted, by the STA, in a same UL frame used for the transmission of the UL sounding element or in a subsequent UL frame.

25. The apparatus according to claim 21, wherein:
the UL sounding TF further indicates whether the STA is to transmit a UL data frame in a same UL frame used for the transmission of the UL sounding element, and
the processing circuitry is further configured to encode the UL data frame for transmission when indicated by the UL sounding TF.

26. The apparatus according to claim 21, the processing circuitry further configured to:
determine, based at least partly on the UL sounding TF received from the AP, one or more DL channel measurements; and
include the DL channel measurements in the UL sounding feedback.

27. The apparatus according to claim 21, wherein the processing circuitry includes a baseband processor to decode the UL sounding TF.

28. The apparatus according to claim 26, wherein the DL channel measurements are in a group that includes a beam steering matrix based on a DL reception at the STA, a DL signal to noise ratio (SNR) or DL channel state information (CSI).

29. The apparatus according to claim 21, wherein the UL sounding element includes a null data packet (NDP) that includes a long training field (LTF).

30. The apparatus according to claim 21, wherein the STA is arranged to operate in accordance with a wireless local area network (WLAN) protocol.

31. The apparatus according to claim 21, wherein the apparatus further includes a transceiver to receive the UL sounding TF, to transmit the UL sounding element, and to transmit the UL sounding feedback.

* * * * *